Oct. 31, 1950
F. R. ELLENBERGER
2,528,218
MULTIPLE SELF-BALANCING POTENTIOMETER SYSTEM
Filed Dec. 31, 1949
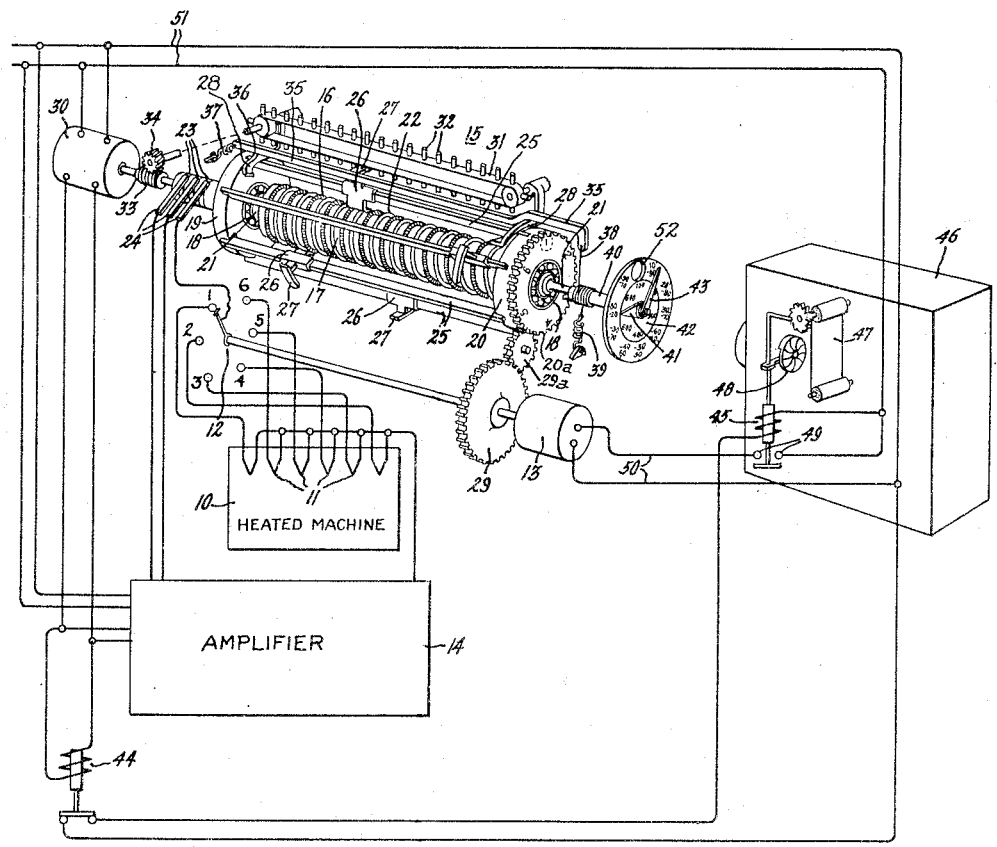
Inventor:
Francis R. Ellenberger
by Paul A. Frank
His Attorney.

Patented Oct. 31, 1950

2,528,218

UNITED STATES PATENT OFFICE 2,528,218

MULTIPLE SELF-BALANCING POTENTIOMETER SYSTEM

Francis R. Ellenberger, Cedar Grove, N. J., assignor to General Electric Company, a corporation of New York Application December 31, 1949, Serial No. 136,343

2 Claims. (Cl. 346—32)

This invention relates to a multiple self-balancing potentiometer system which is useful for repeatedly measuring a series of similar electrical signals in rapid succession and, more particularly, to such a potentiometer system for use in rapid repeated temperature measurements by means of a series of thermocouples.

In the development of apparatus such as gas turbines to be operated at high temperature, accurate and rapid repeated temperature measurements are necessary to measure the tail pipe temperatures. These temperatures, especially in gas turbines which are to be used for jet propelled aircraft, are very critical, for a maximum power output is desired, yet the output must be limited at a point where the temperatures will not cause destruction of the machine. It is also desirable to have a permanent record of these temperatures as a function of time as the machine is tested.

It is, therefore, an object of this invention to provide a potentiometer system which will repeatedly measure and record, in rapid succession, a number of electrical signals corresponding to temperatures to be measured.

An apparatus of the above description should preferably be as compact as possible to be easily conveyed to the aircraft in which the gas turbines to be tested are installed.

It is, therefore, a further object of this invention to provide a potentiometer system for rapidly repeated measurements of a series of electrical signals in which the system, and the potentiometer itself, are exceedingly compact, yet efficient and accurate.

This invention, therefore, consists essentially in a self-balancing potentiometer system for rapid repeated measurement of a series of electrical signals, such as may be available from a series of temperature-measuring thermocouples, which employs a potentiometer having a series of sliding contacts, each mounted on a bar of a squirrel cage surrounding the potentiometer resistance element, the squirrel cage being rotatable to position the sliding contacts in contact-making engagement with the potentiometer resistance element, one at a time, for comparing the balancing electrical signal with a standard signal. The potentiometer includes an indicator to visually indicate the potentiometer balance position as well as a numerical designation assigned to the sliding contact which is in the contact-making position, and means for recognizing when a balanced condition exists, and a camera actuated by this means to record the information on the indicator and a further means for then changing the position of the squirrel cage to establish contact-making engagement of the next successive sliding contact and for changing the position of an associated switch for connecting a second electrical signal-producing device, such as a thermocouple, into the circuit.

For more complete understanding of the invention, reference should now be had to the following specification and the accompanying drawing which schematically shows one embodiment of the system of this invention.

Referring more particularly to the drawing, there is shown schematically a machine 10, such as a gas turbine, in which temperatures are to be measured at a series of thermocouples 11. These thermocouples are successively connected into a measuring circuit by a stepping switch 12 which is actuated by a stepping relay 13. The measuring circuit includes an amplifier 14 having a standard voltage source. This amplifier may be of a conventional construction known in the art and commonly used in connection with self-balancing thermocouple temperature-measuring circuits. The circuit also includes a potentiometer indicated generally at 15 with a resistance element 16 which is wound in spaced coil helix on a cylinder 17 of a suitable insulating material. Cylinder 17 and resistance element 16 are mounted on a shaft 21 rotatable in suitable bearings 18 in special end frame discs 19 and 20.

A current collector 22 of conductive material is helically wound on cylinder 17 with the same helical pitch as resistance element 16 and with respective coils spaced immediately adjacent to the coils of resistance 16. Current collector 22 and the terminal ends of resistance element 16 are connected to three collector rings 23 and connections are made to these rings by brushes 24.

At the peripheral edges of end frame discs 19 and 20, there are mounted a series of rectangular bars 25 in suitable notches in the discs which allow for a limited radial movement of the bars with respect to the discs. These bars, together with the discs, form what may be referred to as a squirrel cage. On each of the bars 25 there is mounted a slidable contact 26, each of which is adapted, when properly positioned, to interconnect adjacent turns of resistance element 16 and collector element 22. Each of the slidable contacts 26 is provided with a pointed paddle 27, the function of which is described below. As each of the contacts 26 comes into the uppermost position, the ends of the associated bar 25 come into engagement with guide members 28 which cause the bar 25 to move radially inwardly with respect to the discs 19 and 20 to position the lower portion of contact 26 against the resistance element 16 and the current collector 22. The contacts 26, when not in engagement with guides 28, are positioned away from resistance element 16 by means of springs (not shown) mounted within the end frame discs 19 and 20 which normally bias the bars 25 in a radially outward direction. Only one of the bars 25 is engaged by guides 28 at any one time. The squirrel cage is rotatable independently of cylinder 17 by means of a drive through a gear 29 on the shaft of stepping relay 13 and an idler gear 29a which meshes with gear teeth 20a in end frame disc 20.

Cylinder 17 is rotatable by means of a motor 30 in response to a signal from amplifier 14. As cylinder 17 rotates, the contact 26, which is in engagement with resistance 16 and current collector 22, is properly axially indexed with respect to these elements by means of a belt 31 which includes spaced pegs 32, two of which straddle the paddle member 27 of contact 26. Belt 31 is movable in response to rotational movement of drum 17 by means of a worm drive from shaft 21 to the belt which includes a worm 33 and a pinion 34. The pointed end of paddle 27 permits the paddle to enter between adjacent pegs 32 on belt 31 as the squirrel cage is rotated to bring the successive contacts 26 into the uppermost position.

A long rocker arm 35 is pivotally mounted at point 36 on the guide 28 at the left and retained in position by means of a spring 37 near point 36 and a cord 38 at the other end of rocker arm 35 tensioned by a spring 39. The lower surface of rocker arm 35 acts as a cam and the arm is supported at this surface by paddle 27. A change in the axial position of the paddle 27 and the associated contact 26, therefore, results in raising or lowering the rocker arm 35. The cord 38 is wrapped around a drum 40 which is thereby rotated in response to these changes in the elevation of rocker arm 35. Cylinder 40 is connected to a pointer 41 at an indicator dial 42 and the pointer 41, therefore, indicates the axial position of the contact 26 which is in engagement with resistance 16 and current collector 22, one pointer revolution indicating contact travel from one end of cylinder 17 to the other. An additional pointer 43 is attached directly to shaft 21 to indicate the rotational position of cylinder 17 to give a fine indication of the potentiometer adjustment.

A voltage relay 44 is connected to amplifier 14 in parallel with motor 30. This relay has contacts which are closed when the potentiometer is balanced and no signal is received by the relay from the amplifier. A circuit is thereby completed for a solenoid 45 which is included in a camera indicated generally at 46. The solenoid 45 advances the film 47 within the camera and trips the camera shutter 48 to make a photographic record of the indications of pointers 41 and 43 on dial 42. Other instruments or devices, such as a clock, for instance, may be included in the picture for a more complete record. Solenoid 45 also closes contacts 49 to complete an energizing circuit 50 to the stepping relay 13.

Suitable alternating current power is supplied by means of power buses indicated at 51 to amplifier 14, motor 30 and camera 46.

The various positions of the squirrel cage corresponding to the operative positions of the various contacts 26 are indicated from the front of dial 42 by means of numbers 1 through 6 on the end of disc 20. These numbers are respectively viewable at the proper times through a window 52 at the top of dial 42. The numeral 1 is shown in the viewable position.

The number of contacts and positions of the squirrel cage can be increased to take care of measurements from additional thermocouples, but only six are shown here for purposes of clarity.

In operation, one of the thermocouples 11 is connected by means of step switch 12 to the potentiometer system where, by means of the self-balancing potentiometer 15, the thermocouple voltage is compared with a standard voltage from within amplifier 14, and if the potentiometer is not properly adjusted to make this comparison measurement, the amplifier supplies energy to motor 30 to rotate the potentiometer cylinder 17 in the proper direction to cause a balancing adjustment. When the balancing adjustment has been completed, amplifier 14 will no longer supply energy to motor 30. Relay 44 will sense this lack of motor energy, closing its contacts and completing the circuit of camera solenoid 45 to take a picture of the potentiometer adjustment position as indicated at the dial 42. The camera solenoid 45 also completes the circuit to stepping relay 13 which immediately, through the step switch 12, connects a second thermocouple into the measuring circuit as well as rotating the squirrel cage of potentiometer 15 to utilize the next sliding contact 26. Recording means other than camera 46 may be alternatively used with the system of this invention.

There is one sliding contact 26 for each thermocouple. As each measurement is taken, the sliding contact which has been used remains in the axial balanced position. When this contact is again used in its turn to measure the corresponding thermocouple signal, the only adjustment necessary to measure the next signal is that required to indicate the change from the previous signal from the thermocouple. Since this measuring device operates extremely rapidly, the change in the successive signals measured from any one thermocouple is relatively small, and only a relatively small adjustment of each contact is, therefore, necessary in any one cycle of operation.

The above-described retension of the balanced position by each of the contacts 26 may be described as a remembering action, and this action itself helps to increase the speed of operation of the system.

It will be seen from the above description that this invention provides an improved means for rapidly and repeatedly measuring and recording a series of electrical signals, such as those derived from thermocouples, to measure a series of temperatures and for making a continuous record of these measurements.

While a specific embodiment has been shown and described, it will, of course, be understood that various modifications may be made without departing from the invention. The appended claims are, therefore, intended to cover any such modifications within the true spirit and scope of the invention.

What I claim as new and desire to secure by Letters Patent of the United States is:

1. In a multiple self-balancing potentiometer system, a series of signal generating means for generating signals in response to a series of conditions to be measured, a step switch for sequentially connecting each of said means for measurement of the signal derived therefrom, an amplifier including a source of voltage with which each of said signals is to be compared, a self-balancing potentiometer for comparing each of said signals and said voltage comprising a rotatable insulating cylinder, an electrical resistance element helically wound on said cylinder, an electrically conductive current collector helically wound on said cylinder with coils respectively positioned adjacent to the coils of said resistor, a series of axially slidable contacts, a squirrel cage surrounding said cylinder and rotatable independently thereof, said squirrel cage including transverse bars corresponding in number to the number of said signal generating means, a slidable contact for each of said signal generating means respectively mounted on each of said bars, a stepping relay connected for simultaneous stepwise rotation of said squirrel cage and said step switch, means for positioning one of said slidable contacts against said resistance element and said current collector for each stepwise position of said squirrel cage, biasing means for each of said transverse bars to keep the remainder of said slidable contacts positioned away from said resistance elements, a motor for rotating said cylinder, drive means for axially moving said slidable contact positioned against said resistance element in accordance with the pitch of the helix of said resistance element as said cylinder is rotated by said motor, electrical connections from said current collector and from the terminal ends of said resistance element through said step switch to said amplifier, connections from said amplifier to said motor for energizing said motor for rotation in a balancing direction in response to an unbalanced condition of said potentiometer, a voltage sensitive relay connected in parallel with said motor having a pair of contacts closable when said motor is de-energized as a balanced condition is attained and recognized by said amplifier, an indicating means for indicating the adjustment of said potentiometer, a camera for photographically recording the successive balance positions of said potentiometer, a camera solenoid for advancing the film and operating the shutter of said camera, said solenoid being connected and arranged to be energized upon the closing of said contacts of said voltage relay, and auxiliary contacts arranged to be closed by said solenoid to complete an energizing circuit to said stepping relay.

2. A self-balancing potentiometer for use in an electrical measurement system for continuous rapid successive measurement of a predetermined number of similar electrical quantities and comprising a rotatably mounted insulating cylinder, a motor for rotating said cylinder in response to a potentiometer unbalance signal received by said motor, means for indicating the rotational position of said cylinder, a resistance element wound upon said cylinder with axially spaced apart helical turns, a current collector conductor wound up on said cylinder with the same helical pitch as said resistance element, the coils of which are respectively positioned between adjacent pairs of coils of said resistance element, a squirrel cage surrounding said cylinder and mounted for rotation independent thereof, means for intermittently rotating said squirrel cage to a number of positions corresponding to the predetermined number of electrical measurements to be taken, said squirrel cage including an axially extending bar for each of said positions, an axially slidable contact on each of said bars, means for positioning one of said contacts against a turn of said resistance element and an adjacent turn of said current collector for each position of said squirrel cage as said squirrel cage is rotated into position and for axially moving said contact as said cylinder is rotated to follow the helical configuration of said resistanec element and said current collector, means for biasing said contacts away from said resistance element when said positioning means is ineffective, a cam lever rotatable in response to the axial position of a slidable contact positioned against said resistance element, and an indicator positioned in accordance with the position of said lever for indicating the axial position of said sliding contact.

FRANCIS R. ELLENBERGER.

REFERENCES CITED

The following references are of record in the file of this patent:

UNITED STATES PATENTS

| Number | Name | Date |
|--------|------|------|
| 1,707,061 | Lewis | Mar. 26, 1939 |
| 2,207,344 | Fairchild | July 9, 1940 |
| 2,336,081 | Finnegan, Jr. | Dec. 7, 1943 |
| 2,337,534 | Barber | Dec. 28, 1943 |
| 2,427,355 | Keinath | Sept. 16, 1947 |
| 2,436,235 | Sunstein | Feb. 17, 1948 |
| 2,477,847 | Zarem | Aug. 2, 1949 |